(12) United States Patent
Koyama

(10) Patent No.: US 7,127,161 B2
(45) Date of Patent: Oct. 24, 2006

(54) LENS BARREL AND OPTICAL APPARATUS

(75) Inventor: Takashi Koyama, Tokyo (JP)

(73) Assignee: Sony Corporation, Tokyo (JP)

( * ) Notice: Subject to any disclaimer, the term of this patent is extended or adjusted under 35 U.S.C. 154(b) by 186 days.

(21) Appl. No.: 10/933,397

(22) Filed: Sep. 3, 2004

(65) Prior Publication Data

US 2005/0089321 A1  Apr. 28, 2005

(30) Foreign Application Priority Data

Sep. 16, 2003  (JP) ............................. 2003-323446

(51) Int. Cl.
*G03B 3/00*  (2006.01)
*G02B 7/02*  (2006.01)

(52) U.S. Cl. ...................... 396/144; 359/823

(58) Field of Classification Search ............. 396/89, 396/144; 359/819, 823

See application file for complete search history.

(56) References Cited

U.S. PATENT DOCUMENTS 3,696,725 A * 10/1972 Lange ........................ 359/823
4,873,542 A * 10/1989 Nakayama .................. 396/144
5,289,320 A * 2/1994 Kobayashi .................. 359/819

* cited by examiner

Primary Examiner—W. B. Perkey
(74) Attorney, Agent, or Firm—Oblon, Spivak, McClelland, Maier & Neustadt, P.C.

(57) ABSTRACT

A lens barrel is proposed, in which the optical adjustment of its lens system can be performed easily and at a reduced cost, and also an optical instrument having such a lens barrel is provided. A lens barrel is provided, which comprises: a lens frame for holding a lens; a holding frame for holding the lens frame; and an adjustment mechanism which, while allowing the lens frame to be pressed and fit into the holding frame thereof with a predetermined abutting force resulting from an elastic force, and while retaining its fit-in state, can adjust a position of the lens frame with regard to said holding frame in the directions of an optical axis via a plurality of stepwise stages by rotating said lens frame around its own axis of rotation.

6 Claims, 4 Drawing Sheets

LENS BARREL AND OPTICAL APPARATUS

CROSS REFERENCE TO RELATED APPLICATION

This application claims priority from Japanese Priority Application No. 2003-323446, filed on Sep. 16, 2003 with the Japanese Patent Office, the entire content of which is hereby incorporated by reference.

BACKGROUND OF THE INVENTION

1. Field of the Invention

The present invention relates to a lens barrel provided with a mechanism to move the lens in the directions of an optical axis, and an optical instrument having the lens barrel thereof.

2. Description of Related Art

As a conventional mechanism for adjusting respective gaps between a plurality of lenses for zooming or focusing in a lens barrel in optical instruments such as cameras or the like, generally there are such ones that make a fine adjustment by inserting a spacer in a lens frame, or that move a lens frame in the directions of an optical axis by use of a helicoidal screw.

However, there are such problems that, in the case of the former, a number of steps are required for removing and reattaching a lens frame in order to select and provide an optimal adjustment spacer, and also, in the latter case, a backlash of the helicoidal screw may affect various functions of the optical instrument.

In the meantime, there has been proposed a method for adjusting the position of a lens in the directions of an optical axis, comprising the steps of forming a reference plane in a hold frame for supporting a lens frame in a stepwise manner, and rotating the lens frame around its own axis so as to alter the reference plane to adopt as disclosed, for example, in the following.

Japanese Patent Application Publication No. 2002-350702.

According to this technique described above, an optimum state of optical adjustment is achieved by abutting a protrusion provided on a rear side of the lens frame against either one of stepwise stages on the holding frame for holding the lens frame. After the optical adjustment having been completed, the lens frame is secured to the holding frame thereof by bonding or the like.

The aforementioned related art, however, is associated with such a problem that because its lens cannot be secured to any one of the reference planes selected during the optical adjustment, the lens is set afloat during the adjustment. Although it may be considered independently to provide an additional mechanism to press the lens frame against the reference plane, there may result in such drawbacks as of an increased number of parts, an increased cost of manufacture, and an increased space for installation thereof.

SUMMARY OF THE INVENTION

The present invention has been contemplated to solve the aforementioned problems associated with the conventional technology, and an object thereof is to provide a lens barrel in which the optical adjustment of its lens system can be performed easily and performed at a reduced cost, and also to provide an optical instrument having such a lens barrel.

In order to solve the aforementioned problems associated with the related art, a novel lens barrel is provided according to the present invention, which is characterized by comprising: a lens frame for holding a lens; a holding frame for holding the lens frame; and an adjustment mechanism which, while allowing for the lens frame to be pressed and fit into the holding frame thereof with a predetermined abutting force resulting from an elastic force, and while retaining its fit-in state, can adjust a position of the lens frame within the holding frame in the directions of an optical axis via a plurality of stepwise stages by rotating the lens frame around its own axis of rotation.

According to this lens barrel according to the present invention, the adjustment mechanism thereof is realized by a unique form and contour of a fit-in section coupling between the holding frame and the lens frame. When the lens frame is rotated around its own axis of rotation, it moves along the contour of the fit-in section, in the directions of the optical axis, and relative to the holding frame. During this operation, because a predetermined abutting force is applied between the holding frame and the lens frame, it is enabled to move the lens frame in the directions of the optical axis while maintaining its fit-in state stably, thereby allowing for the lens frame to stop still stably at any desired position in the optical directions without the help of an external force.

More specifically, the aforementioned adjustment mechanism may be comprised of: a protruding flange strip which is provided on a circumference of either one of the lens frame or the holding frame and the position of which in the directions of an optical axis changes along the circumferential directions thereof; and a pair of grip members which is provided on the other side of the either one of the lens frame or the holding frame, and which grips the flange strip with a predetermined elastic force from the both sides of the flange strip parallel to the direction of the optical axis. At least one of this pair of gripping members which is positioned on either side of the flange strip in the directions of the optical axis has flexibility, and its elastic reaction force applies a predetermined abutting force against the flange strip.

According to the lens barrel of the present invention, there are such advantages that the lens frame is prevented from floating from the holding frame by an abutting force acting between the lens frame and the holding frame therefor, and that the position of the lens frame in the directions of the optical axis can be varied and adjusted to a plurality of positions by a simple operation of rotating the lens frame. Because this abutting force is provided advantageously by a unique shape and contour of the fit-in coupling between the holding frame and the lens frame, there is no need to provide for any additional part to secure the lens frame during its adjustment. Therefore, it becomes possible easily to carry out an optical adjustment of a lens system in a lens barrel, and also to attain space saving. As a result, it becomes possible to provide for an optical instrument incorporating this lens barrel at a reduced cost.

DESCRIPTION OF THE PREFERRED EMBODIMENT

Figure 1:
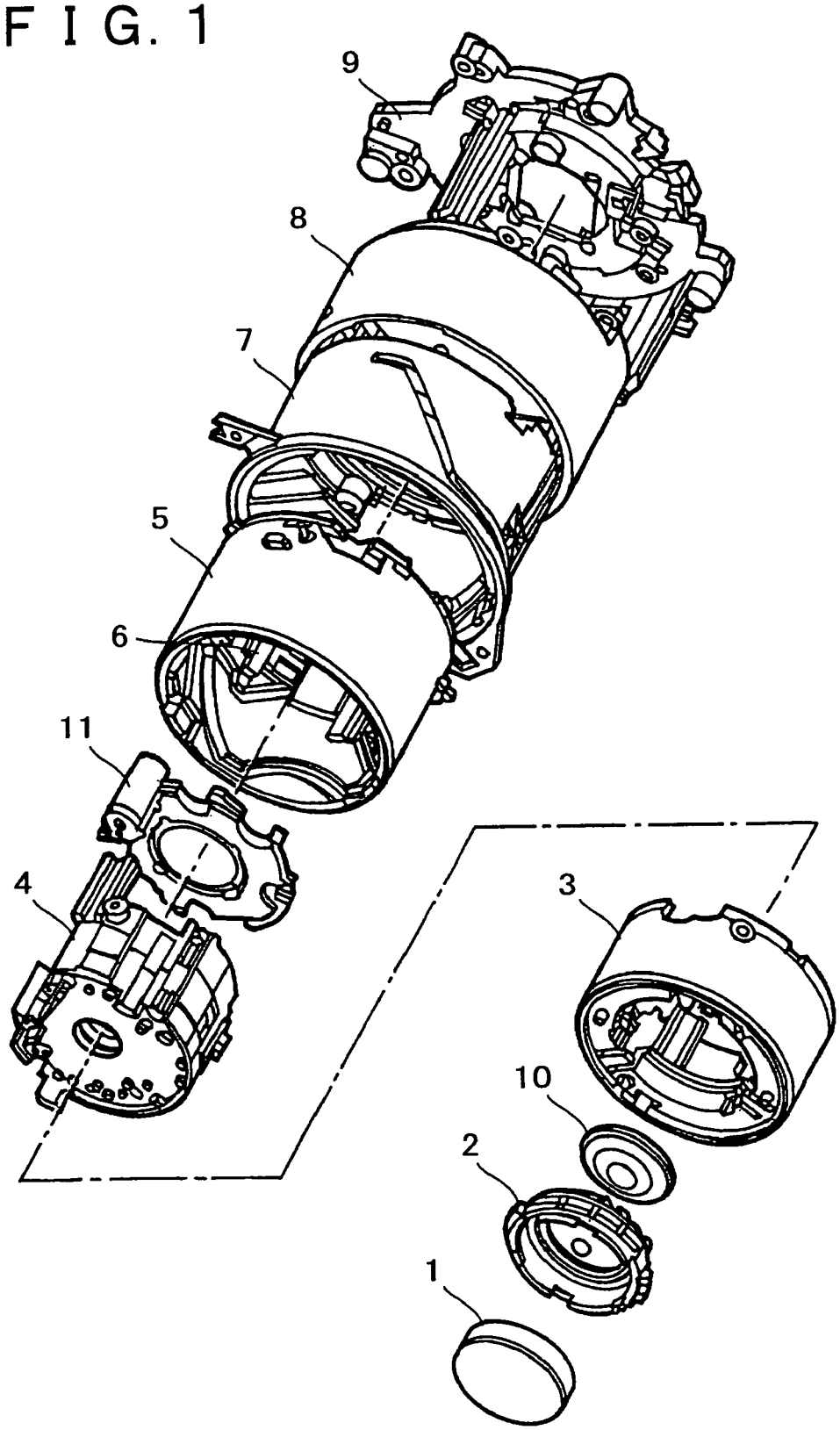
FIG. 1 is an exploded perspective view showing a lens barrel according to a preferred embodiment of the present invention.

A preferred embodiment of the present invention will be described in detail by referring to the accompanying drawings. The preferred embodiment of the present invention will be described by way of example as applied to a lens barrel for use in a digital still camera. FIG. 1 is an exploded perspective view of a lens barrel according to a preferred embodiment of the present invention.

With reference to FIG. 1, the lens barrel according to the preferred embodiment of the present invention is comprised of: a first lens 1; a first group lens frame 2; a first group holding frame 3; a second group unit 4; a cam ring 5; a forward guide ring 6; a stationary ring 7; a rotary ring 8; a rear barrel 9; a second lens 10; a third group unit 11 and the like, which are assembled in alignment with an optical axis (shown by dots-and-lines). Because respective usage and functions of these parts and components are well known, detailed descriptions thereof are omitted. By way of example, in the following description, for the sake of convenience, the directions of an optical axis in FIG. 1 may be used as a reference, and the lower direction in the figure may be referred to as a front side and the upper direction thereof as a rear side.

Figure 2:
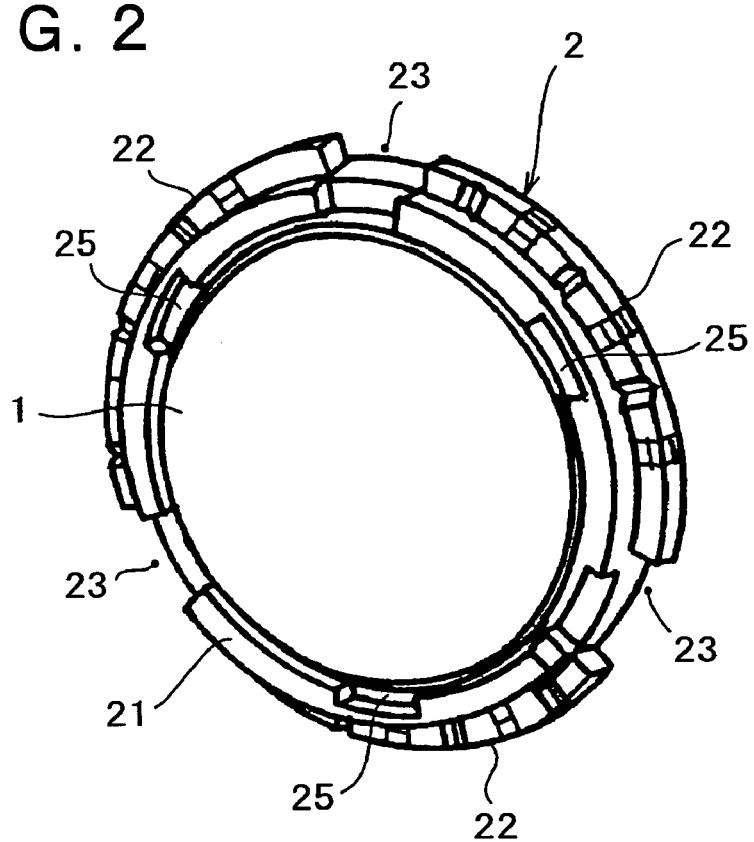
FIG. 2 is a perspective view showing a lens frame for constituting the lens barrel.
Figure 3:
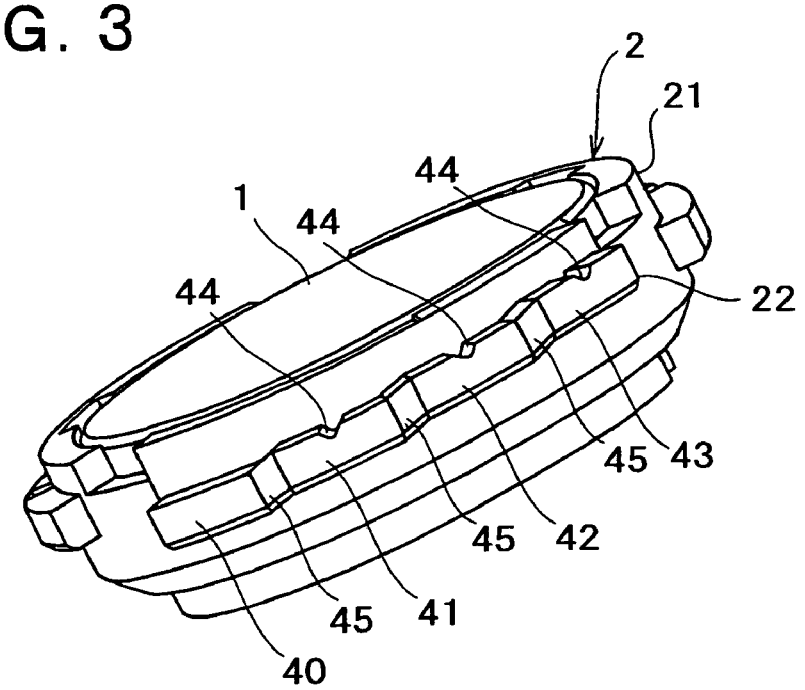
FIG. 3 is a perspective view showing main parts of the lens frame.
Figure 4:
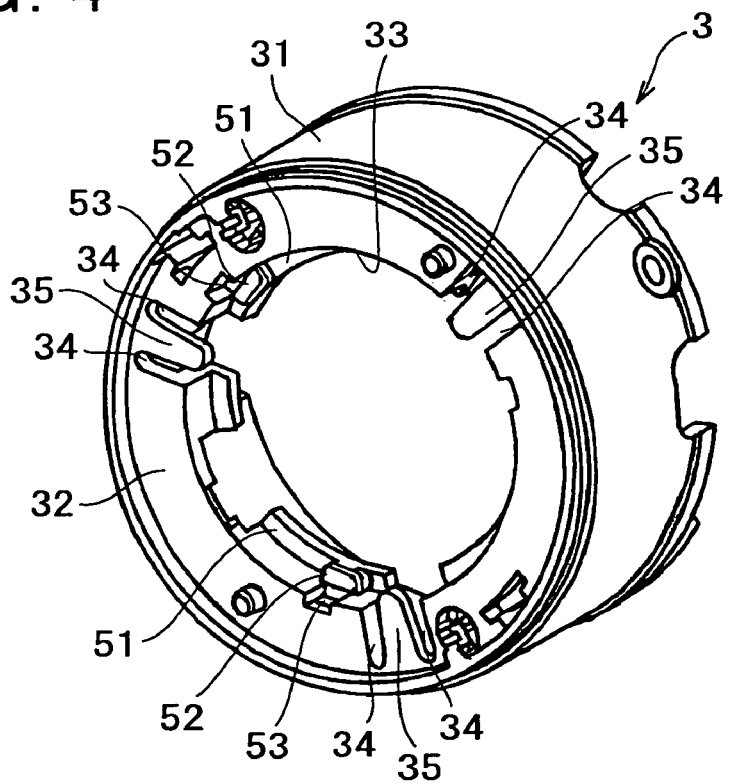
FIG. 4 is a perspective view showing a holding frame for constituting the lens barrel.

In the next, a fit-in coupling structure of a lens frame and a holding frame which constitute a main part of the present invention will be described by way of example based on a relationship between a first group lens frame 2 and a first group holding frame 3. FIG. 2 is a perspective view showing a first group lens frame 2 in a state with a first lens 1 mounted thereon. FIG. 3 is a perspective side view showing a structure of a main portion of the first group lens frame 2. Further, FIG. 4 is a perspective view showing a first group holding frame 3.

As shown in FIGS. 2 and 3, the first group lens frame 2 is made by injection molding (one-piece molding) of a resin material containing a polycarbonate glass by 30%, and it has a cylindrical main body 21 which holds the first lens 1 fit into an inner circumference thereof, and has three pieces of protrusion bars or flange strip (locking member) 22 distributed equidistant from each other on its outer circumference. Each of these flange strips 22 extends circumferentially along a predetermined height on the outer circumference thereof. A slip portion 23 formed between adjoining protruding flange strips 22 provides a passage for a gripping member of a first group holding frame 3 when assembling the first group lens frame 2 into the first group holding frame 3, which will be described later.

As clearly shown in FIG. 3, these protruding flange strips 22 are formed stepwise so as to allow for the position thereof in the directions of the optical axis to be changeable in three stages. That is, the flange strip 22 is formed to have an introductory portion 40 which initially abuts on the gripping member of the first group holding frame to be described later, then, a first abutting portion 41, a second abutting portion 42, and a third abutting portion 43 which are to abut sequentially against the gripping member thereof when the first group lens frame 2 is rotated around its own axis of rotation. Each of the introductory portion 40 and the respective abutting portions has a rectangular shape which has a predetermined breadth in the direction of the optical axis, and abutting planes on the front and the rear sides thereof perpendicular to the optical axis. On a front side abutting plane of respective abutting portions there is provided a notch 44 for catching the grip member of the first group holding frame 3. Then, from the backward direction to the forward direction of the optical axis, these abutting portions are arranged in the order of the introductory portion 40, the first abutting portion 41, the second abutting portion 42 and the third abutting portion 43. A portion between the introductory portion 40 and its adjacent abutting portion 41, and also between respective adjoining abutting portions is connected with a bridge portion 45 which is slanting relative to the optical axis.

Further, on the front side of the main body 21 there are provided adhesive reservoirs 25 each shaped into a groove exposed to an internal circumference thereof, spaced equidistant from each other (separated by 120°) and distributed along the inner circumference thereof. Thereby, after the first lens 1 having been mounted, by supplying adhesive thereto, it is enabled firmly to attach the first lens 1 to the first group lens frame 2 by bonding.

With reference to FIG. 4, a first group holding frame 3 which is formed by injection molding (one-piece molding) of a resin material containing polycarbonate by 30% has a cylindrical main body 31, and a front wall section 32 thereof is formed into an annulus ring by concentratedly extending a predetermined length from the front end periphery of the main body 31. An inner end rim of the front wall section 32 forms a circular through-hole 33 which has approximately a similar diameter as the outermost diameter of the first group lens frame 2 including the flange strip 22. Further, pairs of slits 34 opened toward inside and separated from each pair by 120° are formed in the front wall section 32, wherein between each pair of slits 34 there is provided a presser arm 35 which extends concentratedly perpendicular to the optical axis. An edge of this presser arm 35 extends into the circular hole 33 by a predetermined length, and is flexible in back-and-forth directions.

Further, a support section 51 is formed by extending the inner circumferential rim of the front wall section 32 once in the backward direction except for a position corresponding to the presser arm 35 and bending internally to extend concentratedly. On a respective support section 51 and in the vicinity of the slit 34 described above, there is provided an abutting member 52 which protrudes in the forward direction, and the front plane of which forms a reference plane perpendicular to the optical axis. A pair of this abutting member 52 in combination with the presser arm 35 constitutes a grip unit for gripping the first group lens frame 2 while abutting on respective abutting portions of the first group lens frame 2. Further, a groove of an adhesive reservoir 53 open in the forward direction is provided in the front wall section 32 at a position corresponding to the abutting member 52. After precisely mounting the first group lens frame 2, adhesive is supplied thereto, thereby enabling the first group lens frame 2 to be secured firmly by bonding.

In the next, a method of assembling a lens barrel and a method of adjusting the lens therein according to a preferred embodiment of the present invention will be described by referring to FIG. 1. When assembling the lens barrel, at first a second lens 10 is secured by bonding to a rear fixture of the first group lens frame 2, then the first lens 1 is adjusted to be aligned relative to a reflection center of the second lens 10 used as a reference. According to the preferred embodiment of the present invention, an outer diameter of the first lens 1 is formed smaller approximately by 0.4 mm than an inner diameter of the first group lens frame 2 so as to allow a shifting for alignment adjustment of approximately ±0.2 mm. After completion of the alignment adjustment, the first lens 1 is firmly attached to the first group lens frame 2 by supplying adhesive to the adhesive reservoir 25 therein.

Subsequently, respective parts of the first group holding frame 3, a second group unit 4, a cam ring 5, a forward guide ring 6, a stationary ring 7, a rotary ring 8, a rear barrel 9 and a third group unit 11 are assembled to complete a barrel portion except for units to be accommodated into the first group lens frame 2. After then, the first group lens frame 2 is assembled and secured to the first group holding frame 3.

Figure 5:
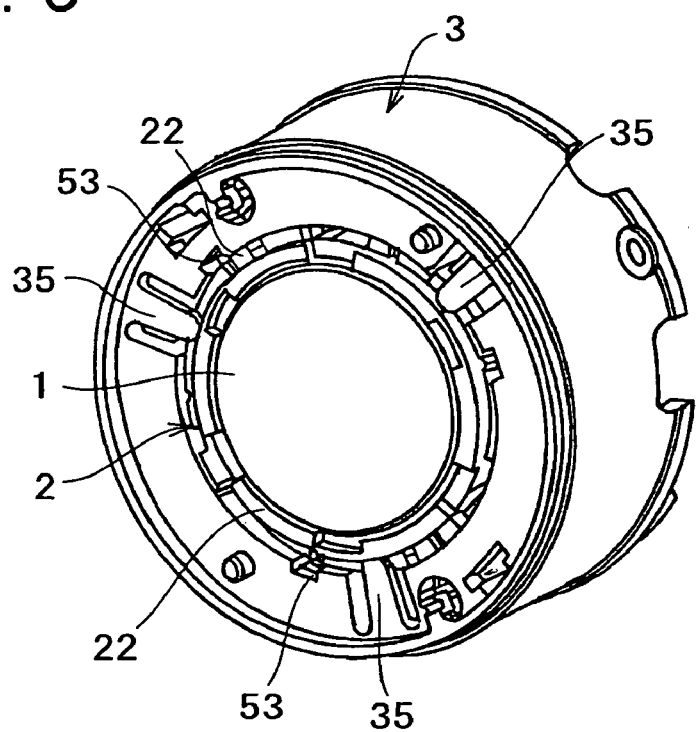
FIG. 5 is a perspective view showing an assembled state of the lens frame and the holding frame.

In the next, a fixture mechanism and a method of securing the first group lens frame 2 to the first group holding frame 3 will be described. FIG. 5 is a perspective view showing an assembled state of the first group lens frame 2 and the first group holding frame 3. FIG. 6A to 6E are schematic diagrams showing a configuration of the adjustment mechanism for adjusting a lens position, and a method of adjustment thereof. By way of example, in FIG. 6A to 6E, the upper direction corresponds to the forward direction, and the lower direction corresponds to the backward direction, respectively.

When assembling the first group lens frame 2 into the first group holding frame 3, the position of the slit 23 in the first group lens frame 2 is aligned with the position of the presser arm 35 in the first group holding frame 3, then the first group lens frame 2 is pressed into the first group holding frame 3. When a rear abutting plane of the flange strip 22 of the first group lens frame 2 comes into abutment against the reference plane of the abutting member 52 of the first group holding frame 3, the first group lens frame 2 is rotated around the optical axis in a clockwise direction with reference to FIG. 5.

Figure 6A:
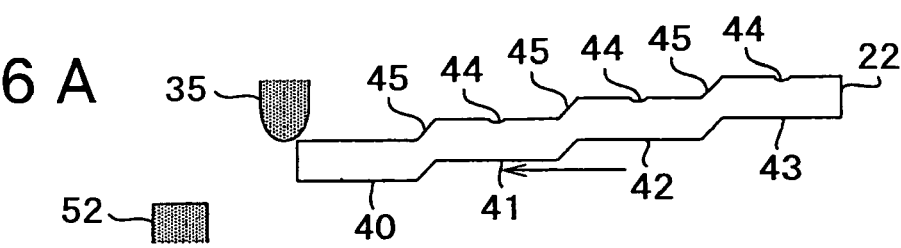
FIG. 6A to 6E are schematic diagrams showing a configuration of a mechanism for adjusting the position of the lens and a method of adjustment thereof.
Figure 6B:
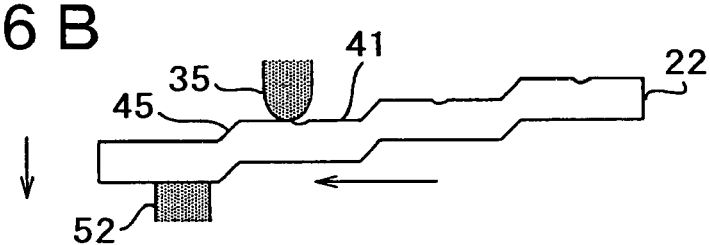

At this instant, as shown in FIG. 6A, the introductory portion 40 of the flange strip 22 of the first group lens frame 2 comes into contact with the presser arm 35 of the holding frame 3, and when the lens frame 2 is further rotated clock-wise, the presser arm 35 climbs up to a first abutting portion 41 thereof via a bridge portion 45 as shown in FIG. 6B, as a result, gripping the flange strip 22 between the presser arm 35 and the abutting member 52 which constitute the gripping pair. In this operation, the first group lens frame 2 moves in the backward direction of the optical axis relative to the first group holding frame 3.

Figure 6C:
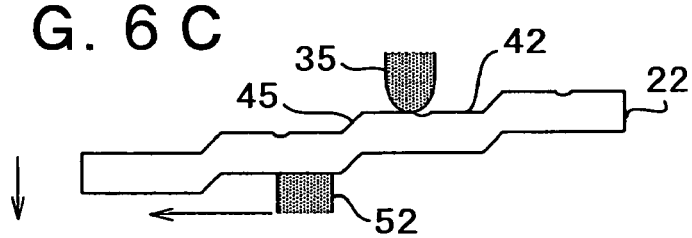
Figure 6D:
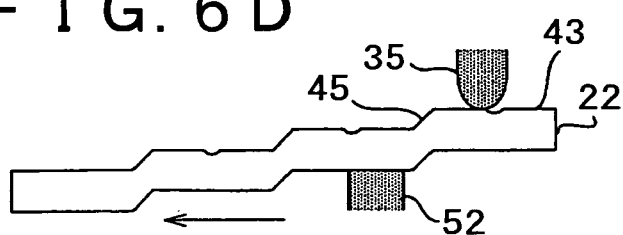

When the first group lens frame 2 is further rotated clockwise from the state of FIG. 6B, the presser arm 35 climbs up to a second abutting portion 42 via a bridge portion 45 as shown in FIG. 6C, and when the first group lens frame 2 is still further rotated, the presser arm 35 climbs up to a third abutting portion 43 via a bridge portion 45 as shown in FIG. 6D. During this operation, the first group lens frame 2 moves backward sequentially in the directions of the optical axis relative to the first group holding frame 3.

By carrying out an inverse operation of the above, it is also enabled sequentially to move the first group lens frame 2 in the forward direction of the optical axis relative to the first group holding frame 3. As described above, the position of the first group lens frame 2 relative to the first group holding frame 3 can be adjusted to reside on any position desired. As a result, the position of the first lens 1 within the lens barrel can be adjusted appropriately and precisely. According to a preferred embodiment of the present invention, the case of FIG. 6E in which a portion thereof gripped between the presser arm 35 and the abutting member 52 lies in the center of the flange strip 22 (that is, a state thereof straddling both the first and the second abutting portions 41, 42) is specified to be a normal position (0) of adjustment as designed. If the position of the first group lens frame 2 deviates from the normal position due to errors in assembling or the like, the first group lens frame 2 is allowed to move in the forward direction (+) or in the backward direction (−) along the optical axis by its rotation.

Figure 6E:
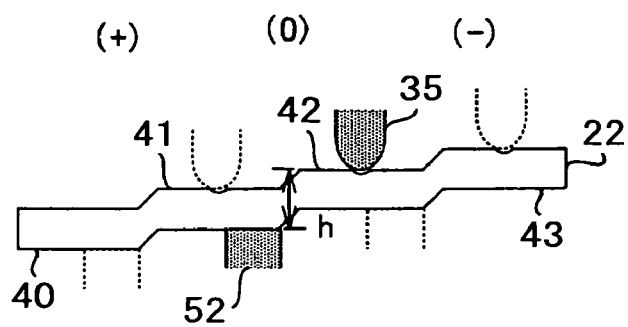

By way of example, the flange strip 22 is formed to have a constant breadth in the directions of the optical axis. As shown in FIG. 6E, a respective distance between the front plane of the first abutting portion 41 and the rear plane of the introductory portion 40, between the front plane of the second abutting portion 42 and the rear plane of the first abutting portion 41, and between the front plane of the third abutting portion 43 and the rear plane of the second abutting portion 42 is retained at a constant value h. On the other hand, a gap between the presser arm 35 and the abutting member 52 is formed slightly smaller than the distance h described above under application of no external force. Therefore, during the movement of the first group lens frame 2 in the directions of the optical axis while the flange strip 22 thereof is inserted and seized between the presser arm 35 and the abutting member 52, the presser arm 35 is elastically deformed by a predetermined quantity in the direction of the optical axis. By use of a reaction force thereof (abutting force), the flange strip 22 is secured without being affected by unstableness. Further, because the distance h is formed always to be constant, a pushing force of the presser arm 35 against the first group lens frame 2 will not change substantially. Therefore, even if a quantity of adjustment of the position becomes large, the flexure of the presser arm 35 will not affect a precision of adjustment.

Then, a flange-back test for inspecting whether or not a gap between the first lens 1 and the second lens 10 is as specified is carried out in the state as shown in FIG. 5 with the first group lens frame 2 being assembled into the first group holding frame 3. If the inspection is passed, adhesive is filled into the adhesive reservoir 53 so as to secure the first group lens frame 2 to the first group holding frame 3 by bonding. If not passed, the position of the first group lens frame 2 relative to the first group holding frame 3 in the directions of the optical axis is readjusted in the manner as described above.

As described hereinabove, according to the lens barrel according to the preferred embodiment of the present invention, it is enabled for the position of the first group lens frame 2 relative to the first group holding frame 3 to be adjusted in the direction of the optical axis sequentially in the three stages merely by rotating the first group lens frame 2, without causing the unstableness by use of the abutting force exerting between the gripping pair of the presser arm 35 in combination with the abutting member 52 and the protrusion flange strip 22. Because this abutting force is obtained from the unique shape of the fit-in coupling arrangement between the first group lens frame 2 and the first group holding frame 3, without the need of provision of any additional part for holding the first group lens frame 2, the optical adjustment of the first lens 1 in the lens barrel can be carried out easily, and also space saving can be achieved. Further, because no other additional parts are required, it is possible to manufacture an optical instrument incorporating the lens barrel described above at a reduced cost. Still further, because a quantity of flexure of the presser arm 35 remains constant, the flexure thereof is unlikely to cause any problem during the adjustment operation of the position of the first group lens frame 2.

Although the invention has been described in its preferred form with a certain degree of particularity, obviously many changes, variations and combinations are possible herein. It is therefore to be understood that any modification will be practiced otherwise than as specifically described herein without departing from the scope of the present invention.

For example, in the above description of the preferred embodiment of the present invention, the position of adjustment for the first group lens frame 2 relative to the first group holding frame 3 has been described to be movable along the three stages, however, it is not limited thereto, and any number of stages, e.g. two stages, four stages or more stages may be adopted therefor. Furthermore, although the invention has been described by way of example in which the flange strip 22 is formed to have a stepwise sequential shape so that the position thereof in the directions of the optical axis changes along plural stages, however, it is not limited thereto, and the flange strip 22 may be formed discontinuously as well provided that the gripping operation by the presser arm 35 and the abutting member 52 is not impaired.

Still further, instead of the stepwise contour, the flange strip 22 may be formed into a continuous slope so that the position thereof in the directions of the optical axis can be changed smoothly. Thereby, the position of the first group lens frame 2 in the directions of the optical axis can be adjusted more precisely.

Furthermore, although the invention has been described by way of example in which the flange strip 22 is provided on the first group lens frame 2 and the gripping pair of the presser arm 35 and the abutting member 52 are provided on the first group holding frame 3, however, it is not limited thereto, and it may be arranged vice versa such that the flange strip 22 is provided on the first group holding frame 3 and the gripping pair of the presser arm 35 and the abutting plate 52 are provided on the first group lens frame 2.

Still further, although the lens barrel according to the preferred embodiment of the present invention has been described specifically as applied to a relation between the first group lens frame 2 and the first group holding frame 3, however, it should be understood that this is also applicable to any other lens group comprising a lens frame and its holding frame.

Furthermore, the lens barrel according to the present invention is applicable not only to the digital still camera described above but also to any other types of cameras, imaging equipment, and to observation equipment such as a microscope or the like.

The present invention is applicable to any optical equipment which requires a positional adjustment in the directions of the optical axis while movably holding the lens frame relative to the holding frame therefor.

What is claimed is:

1. A lens barrel comprising:
   a lens frame configured to hold a lens;
   a holding frame configured to hold said lens frame; and
   an adjustment mechanism configured to press and fit said lens frame into said holding frame with a predetermined abutting force resulting from an elastic force, and while retaining a fit-in state thereof, enables an adjustment of a position of said lens frame with respect to said holding frame in directions of an optical axis via a plurality of stepwise stages through rotation of said lens frame around an axis of rotation thereof,
   wherein said adjustment mechanism includes
   a locking member provided on a circumference of either one of said lens frame or said holding frame and the position of which in the directions of the optical axis is changeable along the circumferential directions thereof; and
   a gripping member provided on another one of said lens frame or said holding frame, said gripping member configured to grip said locking member with a predetermined elastic force from both sides of said locking member parallel to the direction of said optical axis.

2. A lens barrel according to claim 1,
   wherein said locking member is formed in a stepwise shape so as to allow the position thereof in the directions of said optical axis to be changeable in a plurality of stages.

3. A lens barrel according to claim 1,
   wherein said locking member is configured so that an abutting plane thereof is formed into a continuous slope, and that the position thereof in the directions of said optical axis is changeable smoothly.

4. A lens barrel according to claim 1,
   wherein said gripping member is integrally formed with said lens frame or said holding frame.

5. A lens barrel according to claim 1,
   wherein said locking member is formed into a shape so that positions thereof gripped by said gripping member are arranged at a predetermined distance within a range adjustable by said adjustment mechanism.

6. An optical instrument having a lens barrel according to claim 1.

* * * * *